US011729201B2

United States Patent
Shavlik

(10) Patent No.: US 11,729,201 B2
(45) Date of Patent: Aug. 15, 2023

(54) ENTERPRISE SECURITY ASSESSMENT AND MANAGEMENT SERVICE FOR SERVERLESS ENVIRONMENTS

(71) Applicant: Mark Shavlik, White Bear Lake, MN (US)

(72) Inventor: Mark Shavlik, White Bear Lake, MN (US)

(*) Notice: Subject to any disclaimer, the term of this patent is extended or adjusted under 35 U.S.C. 154(b) by 289 days.

(21) Appl. No.: 17/120,876

(22) Filed: Dec. 14, 2020

(65) Prior Publication Data

US 2021/0185077 A1 Jun. 17, 2021

Related U.S. Application Data

(60) Provisional application No. 62/947,875, filed on Dec. 13, 2019.

(51) Int. Cl.
*H04L 9/40* (2022.01)

(52) U.S. Cl.
CPC ................ *H04L 63/1433* (2013.01)

(58) Field of Classification Search
CPC ................................... H04L 63/1433
See application file for complete search history.

(56) References Cited

U.S. PATENT DOCUMENTS

| | | | | |
|---|---|---|---|---|
| 8,683,547 B2* | 3/2014 | Apparao | ........... | H04L 63/20 709/224 |
| 10,255,111 B2* | 4/2019 | Vin | ........... | G06F 9/5077 |
| 2009/0158425 A1* | 6/2009 | Chan | ........... | G06F 21/60 726/21 |
| 2014/0162614 A1* | 6/2014 | Lindeman | ........... | G06Q 30/0603 455/414.1 |
| 2014/0181891 A1* | 6/2014 | Von Bokern | ........... | H04L 63/102 726/1 |
| 2015/0128204 A1* | 5/2015 | Lietz | ........... | H04L 63/062 726/1 |
| 2019/0166162 A1* | 5/2019 | Anand | ........... | H01L 27/0886 |
| 2019/0253269 A1* | 8/2019 | Keane | ........... | H04L 63/0254 |
| 2019/0303608 A1* | 10/2019 | Cohen | ........... | G06N 3/08 |
| 2020/0076835 A1* | 3/2020 | Ladnai | ........... | G06F 16/955 |
| 2020/0236129 A1* | 7/2020 | Barkovic | ........... | H04L 43/045 |
| 2020/0322385 A1* | 10/2020 | Bombacino | ........... | G06F 9/45558 |
| 2021/0037025 A1* | 2/2021 | Schlarman | ........... | H04L 63/1408 |
| 2021/0392135 A1* | 12/2021 | Rao | ........... | H04L 63/20 |
| 2022/0311797 A1* | 9/2022 | Shavlik | ........... | H04L 63/1433 |

FOREIGN PATENT DOCUMENTS

CN 106790256 B * 12/2018
CN 115134127 A * 9/2022

* cited by examiner

*Primary Examiner* — Sarah Su
(74) *Attorney, Agent, or Firm* — Merchant & Gould P.C.

(57) ABSTRACT

Methods and systems for assessment and management of security in serverless environments are provided. One method includes executing an at least partially automated environment discovery process in which an overall security footprint of the enterprise is determined, and automatically identifying, via an enterprise security assessment tool, one or more security applications and associated settings capable of meeting the set of security requirements of the enterprise based on the sets of attributes associated with a plurality of serverless services.

21 Claims, 13 Drawing Sheets

Security Assessment

| Others Like Me | Security Features | Effect on Users | Effort | Impact | Customer Profile | Score |
|---|---|---|---|---|---|---|
| All | Number of Admins | High | Low | Med | All | 100 |
| Yes | Running PIM | High | Low | High | Higher Security | 100 |
| Yes | MFA | High | Low | Very High | None | 50 |
| No | O365 Sharing | Very High | Med | Med | ... | 0 |
| Yes | GDPR Reporting Service | High | High | Very High | ... | ... |
| Yes | SQL Server Compliance | High | High | Very High | ... | ... |
| Yes | Slow Down Servers on Sunday | High | Med | Low | Non-Football retailer | 10 |

FIG. 7

| Rank ▲ | Name<br>Example: !Bob | Groups ▲ | State<br>Example: !disabled | Controls | Risk... ▲ | Admin... ▲ | Impact ▲ | Created ▲<br>Ex: <5\|2020 | Access ▲<br>Ex: <5\|2020 |
|---|---|---|---|---|---|---|---|---|---|
| 1 | Name 1 (email@address.com) | None | Enabled, Member | Users.PIMRoleAssignments.509(14) ▷ | | | Critical | 09/14/20 | 10/22/20 |
| 2 | Name 2 (email@address.com) | None | Enabled, Member | Users.PIMRoleAssignments.509(13) ▷ | | | Critical | 08/25/20 | No Record |
| 3 | Name 3 (email@address.com) | None | Enabled, Member | Users.PIMRoleAssignments.509(13) ▷ | | | Critical | 10/20/20 | No Record |
| 4 | Name 4 (email@address.com) | None | Enabled, Member | Users.PIMRoleAssignments.509(13) ▷ | | | Critical | 08/26/20 | No Record |
| 5 | Name 5 (email@address.com) | None | Enabled, Member | Users.PIMRoleAssignments.509(14) ▷ | | | Critical | 08/25/20 | 10/22/20 |
| 6 | Name 6 (email@address.com) | None | Enabled, Guest-Admin | Users.PIMRoleAssignments.509(14) ▷ | | | Critical | 08/28/20 | 10/22/20 |
| 7 | Name 7 (email@address.com) | None | Enabled, Member | Users.PIMRoleAssignments.509(16) ▷ | | | Critical | 08/26/20 | No Record |
| 8 | Name 8 (email@address.com) | None | Enabled, Member | Users.PIMRoleAssignments.509(17) ▷ | | | Critical | 08/26/20 | No Record |

Scan Complete at Thu Oct 22 2020 21:44:53 GMT-0500 (Central Daylight Time)
Export Users: 1873 Scan Duration: 00:00:00

Page Size 10 ▾  First Prev 1 2 3 4 5 Next Last

ENTERPRISE SECURITY ASSESSMENT AND MANAGEMENT SERVICE FOR SERVERLESS ENVIRONMENTS

CROSS-REFERENCE TO RELATED APPLICATIONS

The present application claims priority from U.S. Provisional Patent Application No. 62/947,875, filed on Dec. 13, 2019, the disclosure of which is hereby incorporated by reference in its entirety.

BACKGROUND

Increasingly, serverless computing environments are utilized by enterprises to allow for flexible remote services to be provided, without the need to worry about local or cloud instances of computing resources. Rather, services are provided in charge on an as-used basis, allowing for automated storage, security, scale, capacity, and operating system type to be automated. This has advantages to end users, because it removes the need to acquire other support services for particular web services, and also removes the headaches with respect to scaling of applications on a realtime, on-demand basis. In particular, end users have no specific computing resources to buy but instead may pay on an as needed as used basis for particular services.

While this arrangement has significant advantages to such end users, it can also introduce significant complexity for enterprises that are typically used to traditional client-server arrangements and which have an obligation to assess and manage network security across all devices and applications that access sensitive data. While in the typical context, security assessment and monitoring tools are available, enterprises that utilize serverless application resources typically would not be exposed to the underlying security features of those serverless implementations (which would typically be managed instead directly by cloud or on-premise vendors that supply serverless resources), but may still need to be able to assess and/or manage security at some level.

This difficulty in terms of resource security management is exacerbated in the serverless context because serverless applications or services may be executed across any of a number of cloud platforms each having different configuration and security parameters and standards. Setting up security for each of these types of services can require significant time and effort. Because industry trends increasingly mean that IT workers have less education or training, it is often the case that enterprise personnel who are tasked with managing serverless security will not have the significant level of training or knowledge that is required to be able to configure such applications.

Accordingly, improvements in terms of flexibility of security management and exposure to security assessment information is desirable for such enterprises.

SUMMARY

In general, the present application relates to an enterprise security assessment and management service that is usable in serverless or partially serverless computing environments. In example implementations, assessment and reporting on security issues is provided to automatically, for example based upon an assessment of an enterprise, comparison of the enterprise to other similarly situated enterprises, or comparison to other standards. Automated adjustments to security settings, for example using robotic process automation, or other automated task execution units, may also be provided.

In a first aspect, a method of automatically managing enterprise security for an enterprise utilizing at least one serverless service is disclosed. The method includes executing an at least partially automated environment discovery process in which an overall security footprint of the enterprise is determined, the overall security footprint including a set of security requirements based on characteristics of the enterprise and a set of attributes associated with each of a plurality of serverless services utilized by the enterprise. The method further includes automatically identifying, via an enterprise security assessment tool, one or more security applications and associated settings capable of meeting the set of security requirements of the enterprise based on the sets of attributes associated with the plurality of serverless services.

In a second aspect, an enterprise security assessment tool stored in a memory and executable on a computing device is disclosed. The tool includes an application programming interface (API) providing a communicative connection to computing resources of an enterprise, the enterprise utilizing a plurality of serverless services. The tool further includes an assessment engine configured to execute an at least partially automated environment discovery process in which an overall security footprint of the enterprise is determined, the overall security footprint including a set of security requirements based on characteristics of the enterprise and a set of attributes associated with each of the plurality of serverless services utilized by the enterprise, and automatically identify one or more security applications and associated settings capable of meeting the set of security requirements of the enterprise based on the sets of attributes associated with the plurality of serverless services.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 7 illustrates an example security report that is capable of being generated by the serverless security assessment tool of the present disclosure.

FIG. 13 is an example user scan interface displayed via the serverless security assessment tool, according to an example embodiment.

DETAILED DESCRIPTION

Figure 1:
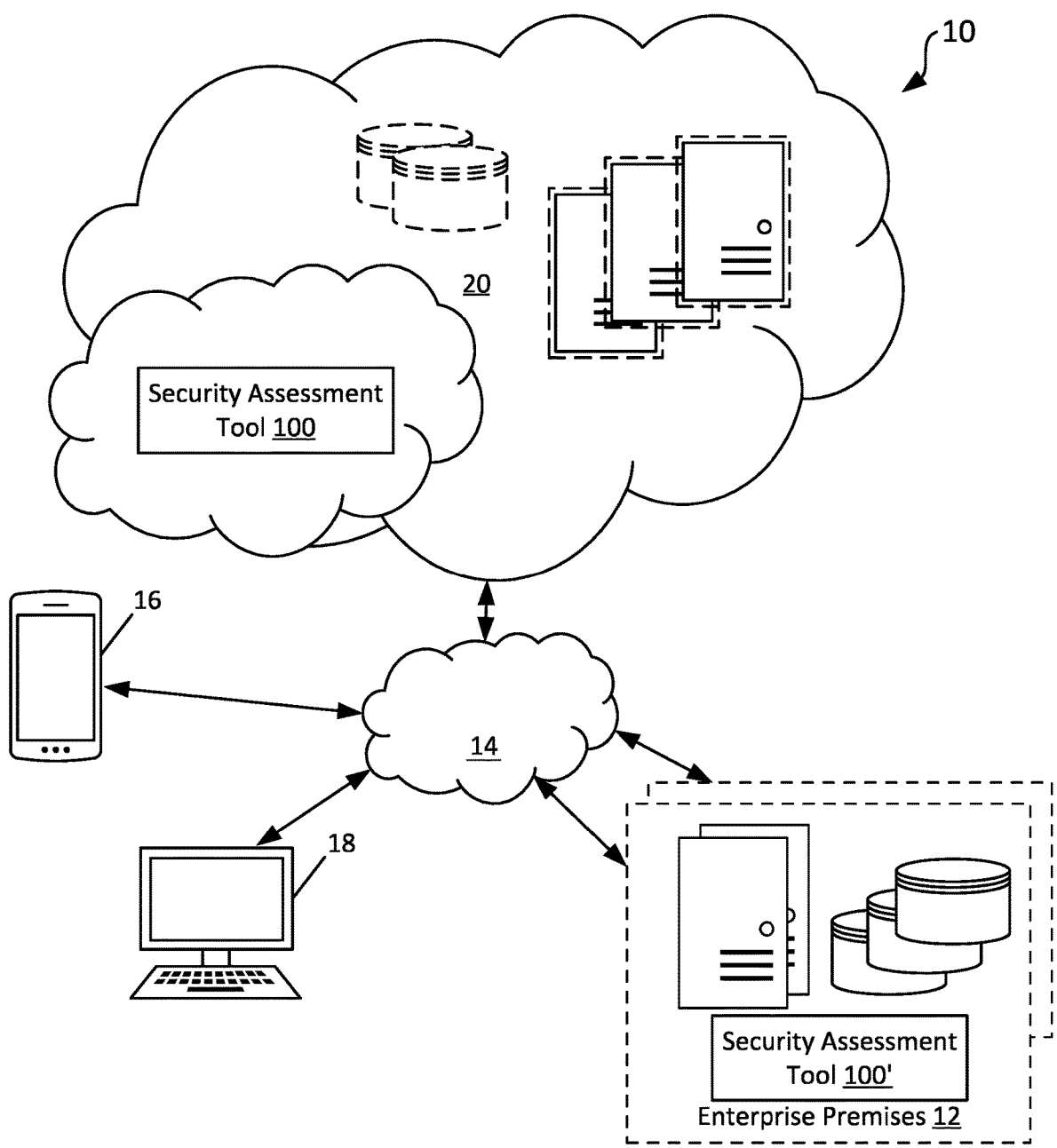
FIG. 1 illustrates an example environment in which aspects of the present disclosure may be implemented.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

As briefly described above, embodiments of the present invention are directed to systems and methods for automated security assessment, monitoring, and reporting in serverless environments. In example aspects, the present application relates to a serverless service configured to assess and report on security issues within a serverless environment. In example embodiments the serverless security assessment service is serverless environment agnostic, meaning that it is capable of operating within any of a variety of cloud environments provided by different cloud providers.

In example implementations, an assessment, profiling, and reporting arrangement may be provided by the serverless service that accommodates both on-premises and cloud physical device security and serverless service or application security. In example embodiments, modeling of similar enterprises and automated process technology may be used to automatically address particular security issues that may be detected within the enterprise. Accordingly, unified, cross cloud automated security may be provided for serverless computing and cloud users while limiting the need for specialized training for enterprise information technology professionals.

Referring first to FIG. 1, an example environment 10 in which aspects of the present disclosure may be implemented is shown. In the example environment 10, of an enterprise may be associated with one or more enterprise premises 12. Enterprise premises 12 correspond to physical locations of the enterprise, which may store various types of computing resources. For example, multiple physical computing networks, database systems, user devices, etc. may be managed therein. Additionally, such enterprise promises 12 may be interconnected via a public network 14, such as the Internet. The enterprise may also accommodate remote devices such as mobile devices 16 and remote workstations 18. Additionally, various cloud providers of different types may be utilized by the enterprise. In the example shown, a generic cloud 20 illustrates various cloud computing resources, such as servers and data storage. The cloud resources may be provided by one or more cloud providers, who may also provide serverless services for additional scalability and convenience. For example, cloud services provided by Amazon Web Services (AWS) and or Microsoft Azure may be utilized by the same enterprise, and security considerations relevant to both cloud services must be considered. Additionally, each cloud service provider may provide separate types of serverless services, which have different security needs (both from the perspective of the services provided being different, and from the perspective that each serverless service may be configured differently by different enterprises).

In the example shown, a security assessment tool 100 is provided. The security assessment tool 100 may be, in example implementations, managed within a cloud storage service. In alternate implementations, the security assessment tool 100 may be managed from a local or remote computing system that is not managed by cloud services (e.g., seen as a local version of the security assessment tool 100'). In some examples, only a portion of the security assessment tool is maintained at the enterprise premises, for example, one or more bots or user interface components that are described below.

In the various implementations, the security assessment tool 100 is configured to determine cross cloud and on-premises security needs for serverless services, such as administrator accounts, non-administrator accounts, monitoring, logging and other common security needs. This is accomplished, in some cases, by automated detection, or by simple questions asked of an enterprise information technology professional. Still further, and as described herein, the security assessment tool 100 is also configured to determine the number of user accounts and what other services are being used. Once the security needs are understood, the security assessment tool 100 is configured to report on how the security services that help serverless computing, provided by the cloud or other vendors can be used, can be properly used. If a service is being used, it is inspected for proper user use, or if it is required by the enterprise at all, based on automatically-assessed enterprise needs.

Figure 2:
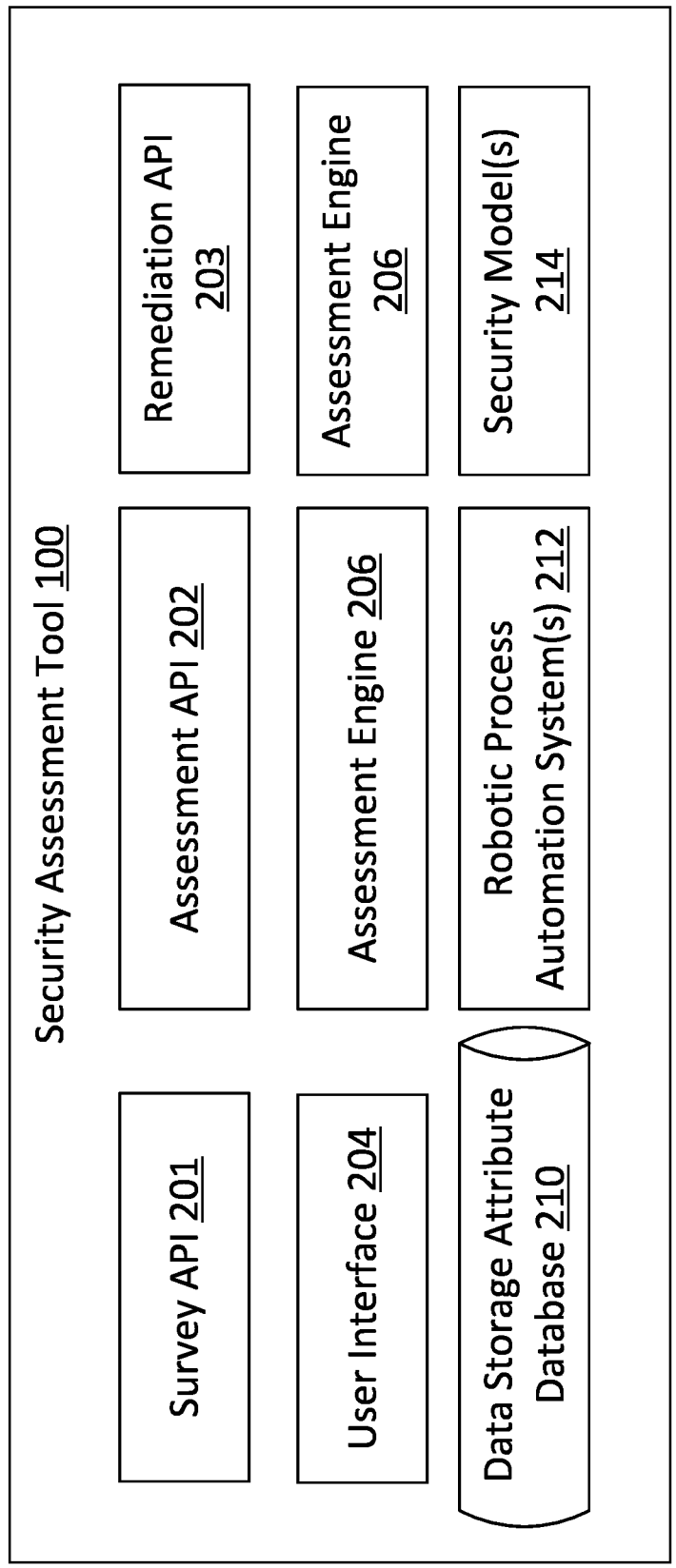
FIG. 2 illustrates an example block diagram of a serverless security assessment tool according to an example embodiment of the present disclosure.

Referring now to FIG. 2, an example of a security assessment tool 100 is illustrated, according to an example embodiment. In the example shown, the security assessment tool 100 includes a plurality of application programming interfaces (APIs) including a survey API 201, an assessment API 202, and a remediation API 203. In addition, the security assessment tool can include a user interface 204 and an assessment engine 206. In addition, the security assessment tool may either store or manage a data storage attribute database 210, robotic process automation systems 212, and one or more security models 214.

In example embodiments, the APIs 201-203 provide an access interface by which users may interact with the security assessment tool 100. For example, the survey API 201 allows for remote access of the security assessment tool 100 to survey security settings of the enterprise. Assessment API 202 provides access to assessment features of the security assessment tools, such as are provided by the assessment engine 206, described below. Additionally, the remediation API 204 may provide access to not only the assessment engine 206, but also to initiate usage of robotic process automation systems 212 and/or security models 214 for purposes of initiating security remediation steps, either manually or automatically, as noted below.

In example embodiments, the user interface 204 provides an information technology user with a view of an enterprise security assessment. For example, the user interface 202 may present to the user one or more prompts that allow the user to define an enterprise topology including data storage locations and data access rights, an enterprise user base, data storage requirements the enterprise is subject to (e.g., HIPAA, PCI data storage), local and cloud computing resources used, as well as serverless services integrated by the enterprise and other types of enterprise specific information. The user interface 204 may also present to the user a report regarding specific types of security concerns, as well as a score for the enterprise based on a current status of the enterprise (e.g., relative to a predetermined standard or other similarly situated enterprises), and one or more recommended actions to be taken.

In the example embodiments, the assessment engine 206 is configured to direct a guided or automated security assessment process for a particular enterprise that utilizes one or more serverless services. For example, the assessment engine 206 may be configured to determine a security footprint of a selected enterprise, including a set of security requirements based on characteristics of the enterprise and attributes of serverless services used by the enterprise that are either automatically determined or input to the assessment engine 206 via the user interface 204. Additionally, the assessment engine 206 may, following such a discovery process, automatically identify security applications and associated settings capable of meeting security requirements of the enterprise based on the attributes of the serverless services and the characteristics of the enterprise. The assessment engine 206 may, for example, discover and review event logs associated with one or more services utilized by the enterprise, such as serverless services and other types of services (e.g., database event logs, access logs, etc.).

In example embodiments, the assessment engine 206 may execute continuously or periodically, thereby providing a continuous or ongoing assessment security for serverless services utilized by an enterprise. Accordingly, as such services may change or as different services are added by the enterprise, the assessment engine 206 may automatically detect and recommend changes to or additions to security settings or applications that are used by that enterprise.

Figure 9:
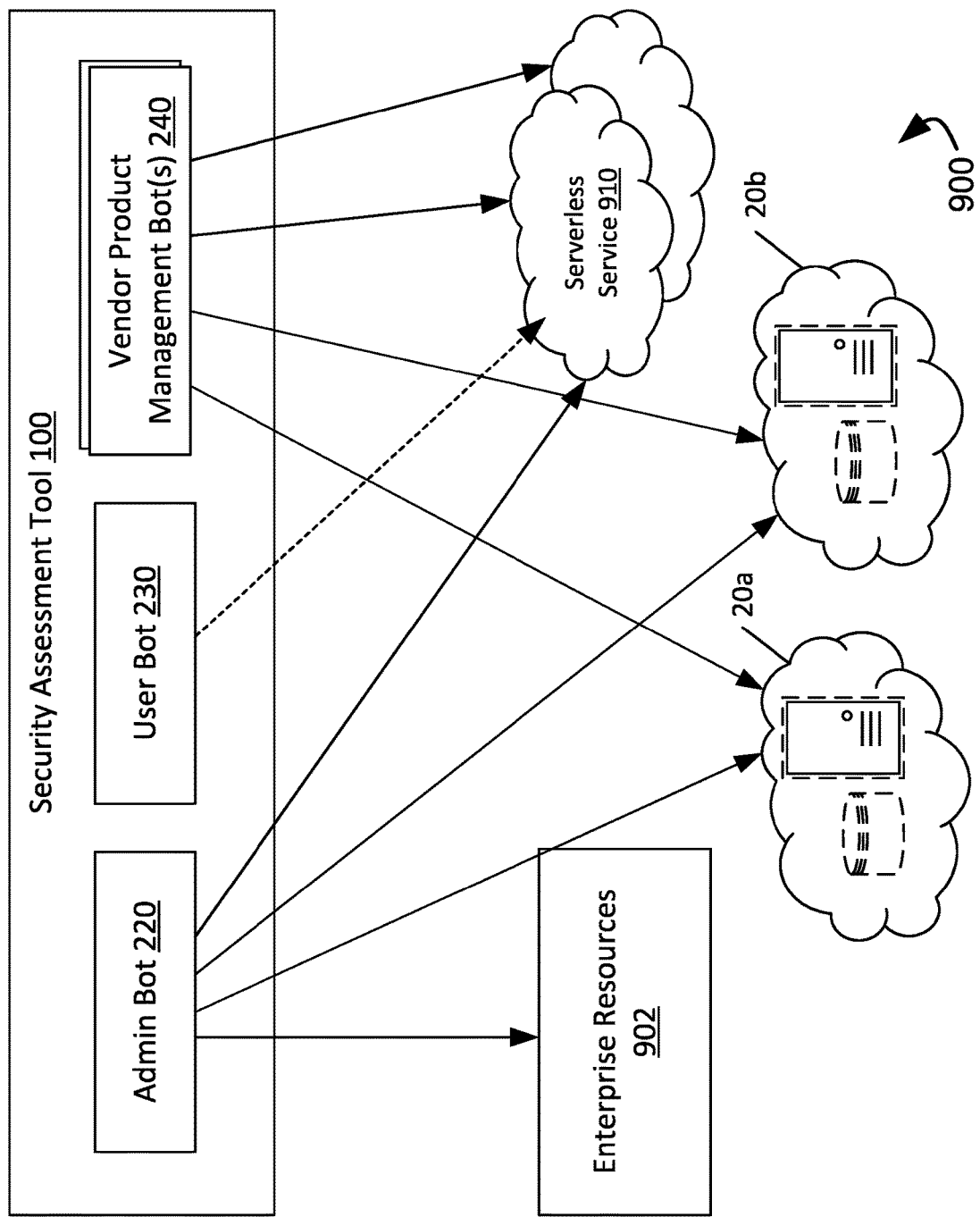
FIG. 9 illustrates an environment in which serverless security assessment is performed for a particular enterprise, according to an example embodiment.

In example embodiments, the assessment engine 206 may directly monitor one or more enterprises in accordance with the functionality described herein. However, in alternative embodiments, the assessment, monitoring, recommendation, and action taking can be offloaded to one or more bots implementing robotic process automation tasks, for example as illustrated in FIG. 9 and discussed below.

As noted above, the security assessment tool 100 may access a data storage attribute database 210. The data storage attribute database 210 may be managed by the security assessment tool 100 directly, or may be accessed from a remote location (e.g., from within the enterprise being assessed). The data stored at the database 210 cannon store the data captured via the user interface 204 or one or more APIS 201-203, as well as information automatically captured based on an assessment of an enterprise. Additionally, the data storage attribute database 210 may store attributes describing other enterprises, for example for comparison purposes. The data storage attribute database 210 may be utilized by the assessment engine 206 for purposes of storing characteristics or attributes of the enterprise or serverless services utilized by the enterprise, for purposes of future analysis.

It is noted that, in many embodiments, the data storage attribute database 210 may store select customer data, anonymous data, or other types of data descriptive of the enterprise, but typically will not store any enterprise security configuration data. This ensures that use of the security assessment tool does not cause additional security vulnerability exposure to the enterprise. Generally, to the extent enterprise security configuration data is obtained during assessment of the enterprise (or other enterprise-specific security In the example shown, the security assessment tool 100 may also include or have access to one or more robotic process automation systems 212. The security assessment tool 100 may use such systems 212 to automatically configure various security settings of an enterprise based on the assessment performed by the assessment engine 206. For example, the one or more robotic process automation systems 212 may be usable to monitor existing security settings, recommend and install new security solutions, and remove solutions that may no longer be needed.

In example embodiments, the robotic process automation systems 212 may be maintained by each enterprise, or alternatively may be maintained by the entity providing the security assessment tool 100. The robotic process automation systems 212, in either case, may be maintained separately from the tool 100, but accessible from and integrated with the tool.

In the embodiment shown, one or more security models 214 may be managed by or accessible to the security assessment tool 100. The security models may be, for example, derived models that are generated from mathematical abstractions other, the modeled enterprises and their related security settings. For example, data stored in a data storage attribute database 210 may be used to generate one or more models using, for example, a statistical algorithm and/or convolution neural networks (CNNs). Such models may be used to obtain a recommended set of security settings and security attributes for the enterprise, or may be used to generate scores associated with particular attributes of the enterprise and recommended changes to security settings. Such attributes and security settings may be updated periodically, and therefore the security assessment tool 100 may ensure secure access to server less services on a real time or periodic basis.

In some embodiments, the security assessment tool 100 may implement and deploy one or more automated bots which may be implemented using the robotic process automation systems 212 and optionally one or more security models 214. For example, a web crawler bot or rule based automation bot may be deployed to analyze an enterprise, in particular focused on profiling the enterprise and automating security assessment and security policy application tasks.

Figure 3:
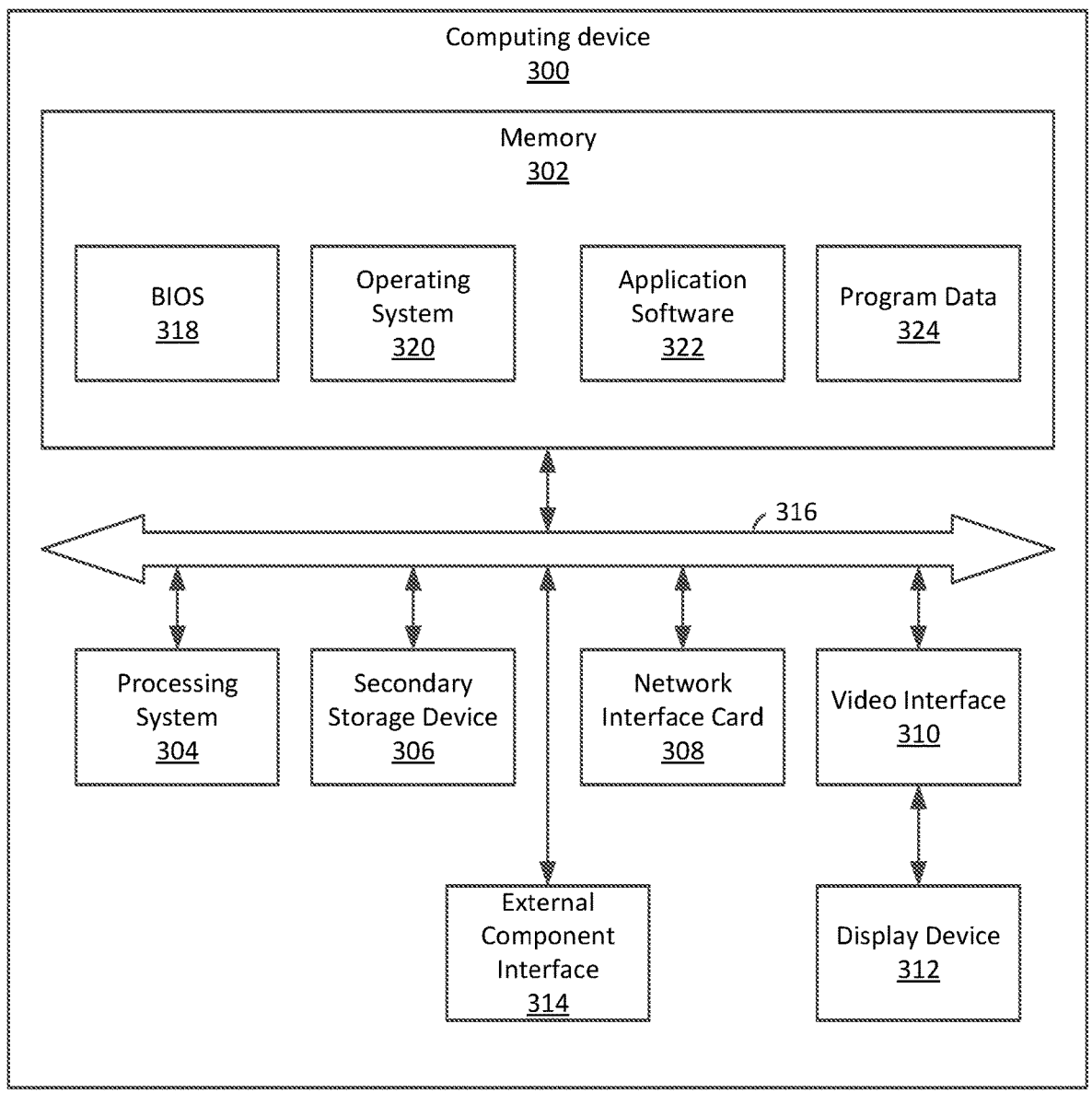
FIG. 3 illustrates a block diagram of a computing system with which aspects of the present disclosure may be implemented.

Referring now to FIG. 3, a computing device 300 is shown, with which aspects of the present disclosure can be implemented. The computing device 300 can be used, for example, to implement any of the cloud and/or enterprise computing devices of FIGS. 1-2.

In the example of FIG. 3, the computing device 300 includes a memory 302, a processing system 304, a secondary storage device 306, a network interface card 308, a video interface 310, a display unit 312, an external component interface 314, and a communication medium 316. The memory 302 includes one or more computer storage media capable of storing data and/or instructions. In different embodiments, the memory 302 is implemented in different ways. For example, the memory 302 can be implemented using various types of computer storage media, and generally includes at least some tangible media. In some embodiments, the memory 302 is implemented using entirely non-transitory media.

The processing system 304 includes one or more processing units, or programmable circuits. A processing unit is a physical device or article of manufacture comprising one or more integrated circuits that selectively execute software instructions. In various embodiments, the processing system 304 is implemented in various ways. For example, the processing system 304 can be implemented as one or more physical or logical processing cores. In another example, the processing system 304 can include one or more separate microprocessors. In yet another example embodiment, the processing system 304 can include an application-specific integrated circuit (ASIC) that provides specific functionality. In yet another example, the processing system 304 provides specific functionality by using an ASIC and by executing computer-executable instructions.

The secondary storage device 306 includes one or more computer storage media. The secondary storage device 306 stores data and software instructions not directly accessible by the processing system 304. In other words, the processing system 304 performs an I/O operation to retrieve data and/or software instructions from the secondary storage device 306. In various embodiments, the secondary storage device 306 includes various types of computer storage media. For example, the secondary storage device 306 can include one or more magnetic disks, magnetic tape drives, optical discs, solid-state memory devices, and/or other types of tangible computer storage media.

The network interface card 308 enables the computing device 300 to send data to and receive data from a communication network. In different embodiments, the network interface card 308 is implemented in different ways. For example, the network interface card 308 can be implemented as an Ethernet interface, a token-ring network interface, a fiber optic network interface, a wireless network interface (e.g., WiFi, WiMax, etc.), or another type of network interface.

The video interface 310 enables the computing device 300 to output video information to the display unit 312. The display unit 312 can be various types of devices for displaying video information, such as an LCD display panel, a plasma screen display panel, a touch-sensitive display panel, an LED screen, a cathode-ray tube display, or a projector. The video interface 310 can communicate with the display unit 312 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 314 enables the computing device 300 to communicate with external devices. For example, the external component interface 314 can be a USB interface, a FireWire interface, a serial port interface, a parallel port interface, a PS/2 interface, and/or another type of interface that enables the computing device 300 to communicate with external devices. In various embodiments, the external component interface 314 enables the computing device 300 to communicate with various external components, such as external storage devices, input devices, speakers, modems, media player docks, other computing devices, scanners, digital cameras, and fingerprint readers.

The communication medium 316 facilitates communication among the hardware components of the computing device 300. The communications medium 316 facilitates communication among the memory 302, the processing system 304, the secondary storage device 306, the network interface card 308, the video interface 310, and the external component interface 314. The communications medium 316 can be implemented in various ways. For example, the communications medium 316 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 302 stores various types of data and/or software instructions. The memory 302 stores a Basic Input/Output System (BIOS) 318 and an operating system 320. The BIOS 318 includes a set of computer-executable instructions that, when executed by the processing system 304, cause the computing device 300 to boot up. The operating system 320 includes a set of computer-executable instructions that, when executed by the processing system 304, cause the computing device 300 to provide an operating system that coordinates the activities and sharing of resources of the computing device 300. Furthermore, the memory 302 stores application software 322. The application software 322 includes computer-executable instructions, that when executed by the processing system 304, cause the computing device 300 to provide one or more applications. The memory 302 also stores program data 324. The program data 324 is data used by programs that execute on the computing device 300.

Although particular features are discussed herein as included within an electronic computing device 300, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

It is noted that, in some embodiments of the computing device 300 of FIG. 3, the computer-readable instructions are stored on devices that include non-transitory media. In particular embodiments, the computer-readable instructions are stored on entirely non-transitory media.

Figure 4:
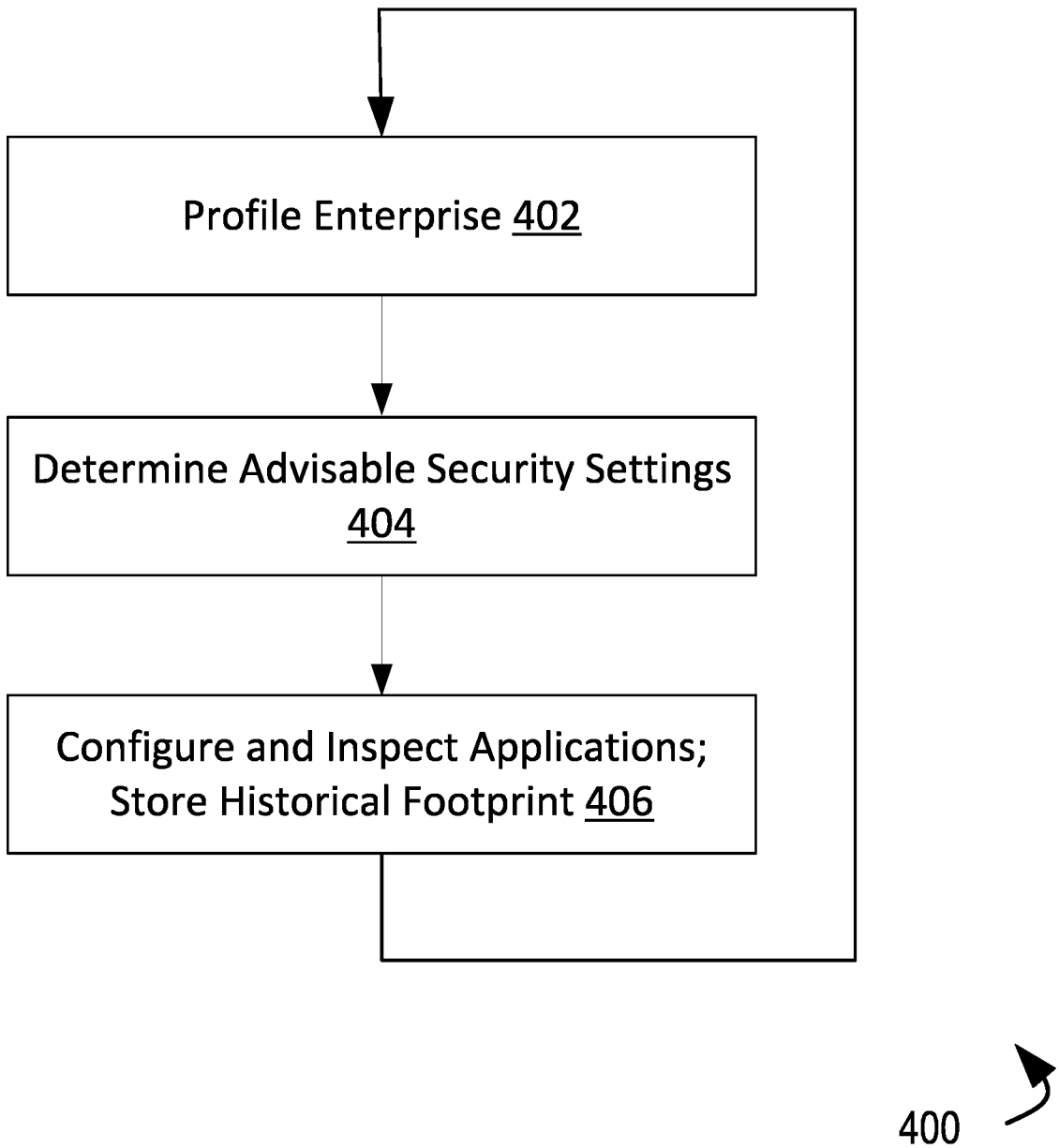
FIG. 4 illustrates an overall process flow chart for assessment and management security in a serverless or partially serverless environment according to aspects of the present disclosure.

Referring now to FIGS. 4-8, additional details regarding operate a of a security assessment tool 100 are provided, according to example embodiments. Referring specifically to FIG. 4, an overall method 400 of operation of such a security assessment tool is provided. In the example shown, the security assessment tool may be utilized to profile a selected enterprise (step 402). Profiling the enterprise may include, for example, review of the event logs to determine locations of data, data attributes, user identities and roles, types of services used by the enterprise, data the security measures and requirements, and various other enterprise attributes. In particular examples, profiling the enterprise can include assessment of physical security, review of event logs to determine data access, review of remote access activity, evaluation of sever configuration control, review of virus scan results, analysis of data backup policies and practices, hardware replacement policies and practices, remote management tools, server resource usage, password strength requirements, storage fault tolerance, equipment integrity, and various other types of enterprise attributes.

Profiling the enterprise may be performed, for example, in an at least partially automated manner. In some examples, profiling may involve a guided question and answer process with an information technology professional; in alternative examples the profiling may also involve an automated discovery process. In other embodiments, profiling may be performed, at least in part, using one or more bots operationally interfaced to the enterprise and controlled via the security assessment tool 100, as noted above.

In the example shown, the method 400 further includes determining advisable security settings for the enterprise (step 404). This may be accomplished in a variety of ways. For example current enterprise attributes and settings may be compared to those of similarly situated enterprises or may be assessed and scored according to an objective scoring system. Example advisable actions can include, for example, enforcing strong authentication for administrators, or removing certain administrators; removing inactive user accounts; changing a password management policy or enforcing stronger passwords; recommending changes to vendor security management solutions or configurations of those solutions; One example of a report illustrating such a scoring system is seen below in connection with FIG. 7. However, in alternative examples, the advisable security settings may be delivered in other report forms or via notifications on a real-time or near real-time basis. For example, the security assessment tool can initiate notifications directly from that tool, or from existing notification solutions (e.g., Azure Notification Hubs, pushjs, etc.)

Still further, the method 400 can include configuring and inspecting one or more security applications associated with the enterprise (step 406). This can include, for example, applying one or more recommended settings for security applications that are associated with serverless services used by the enterprise, as well as storing a historical footprint of the enterprise alongside the settings determined to be appropriate for that footprint. Accordingly, as a footprint of the enterprise changes (e.g., based on changes in data storage, changes in users, or changes in serverless services utilized) the footprint may be re-analyzed by re-profiling the enterprise to determine a new set of advisable security settings and reconfiguring the security settings of that enterprise.

Figure 5:
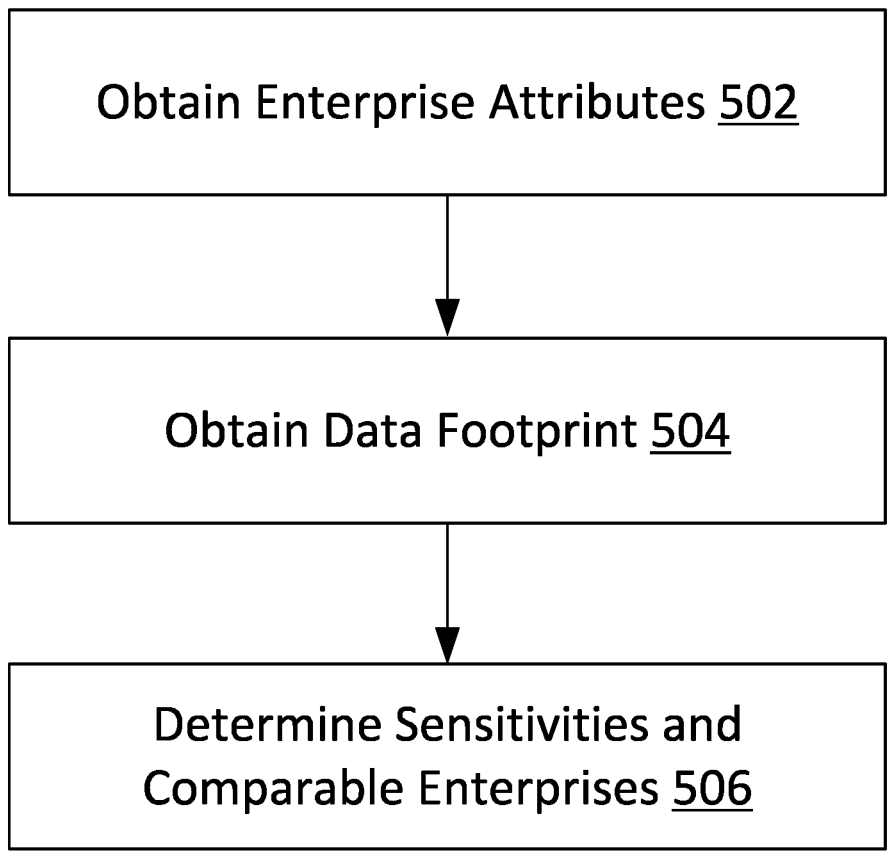
FIG. 5 illustrates a process flow chart for profiling an enterprise including a serverless or partially serverless environment according to aspects of the present disclosure.

Referring to FIG. 5, a method 500 of profiling a selected enterprise is provided. The method 500 may be, for example, one way in which the step 402 of method 400 may be accomplished. In the example shown, the method 500 includes obtaining enterprise attributes (step 502) which can be accomplished through an at least partially automated process by which the security assessment tool 100 determines a set of enterprise attributes. The enterprise attributes can include, for example, the users associated with the enterprise and the access rights required by those users; operational requirements of the enterprise; enterprise facility definitions and access rights to those facilities; physical locations and data security regulation compliance requirements; business activities and priorities; and various other types of enterprise attributes.

In the example shown, the method 500 further includes obtaining a data footprint of the enterprise (step 504). Obtaining the data footprint of the enterprise can include performing a data exploration process by the security assessment tool 100 to determine locations at which data is stored within the enterprise, including on-premise and cloud storage. It can also include determining access rights to each data storage location and users associated with the various data storage locations.

In addition, the method 500 can further include determining security sensitivities of the enterprise, and optionally comparing the enterprise attributes and sensitivities to other, comparable enterprises (step 506). The security sensitivities may include, for example, security requirements defined by local law or regulation based on a type of user accessing data, type of data being accessed, or type of processing to be performed by the enterprise (e.g., handling HIPAA or PCI data, compliance with the General Data Protection Regulation (GDPR) and/or California Consumer Privacy Act (CCPA), etc.). Comparison of similarly situated or compare below enterprises may include, for example, comparing security settings for two enterprises subject to HIPAA or PCI data security requirements, or otherwise comparing enterprises based on similarity of attributes to determine similarities or best practices regarding security services and/or settings used.

Generally, the method 500 represents assessment of an enterprise if such that one or more reports of the current state of security of serverless services used by the enterprise may be generated, and recommended action items provided. In addition, as further discussed below, actions to directly modify security features of an enterprise may be taken by the security assessment tool 100.

Figure 6:
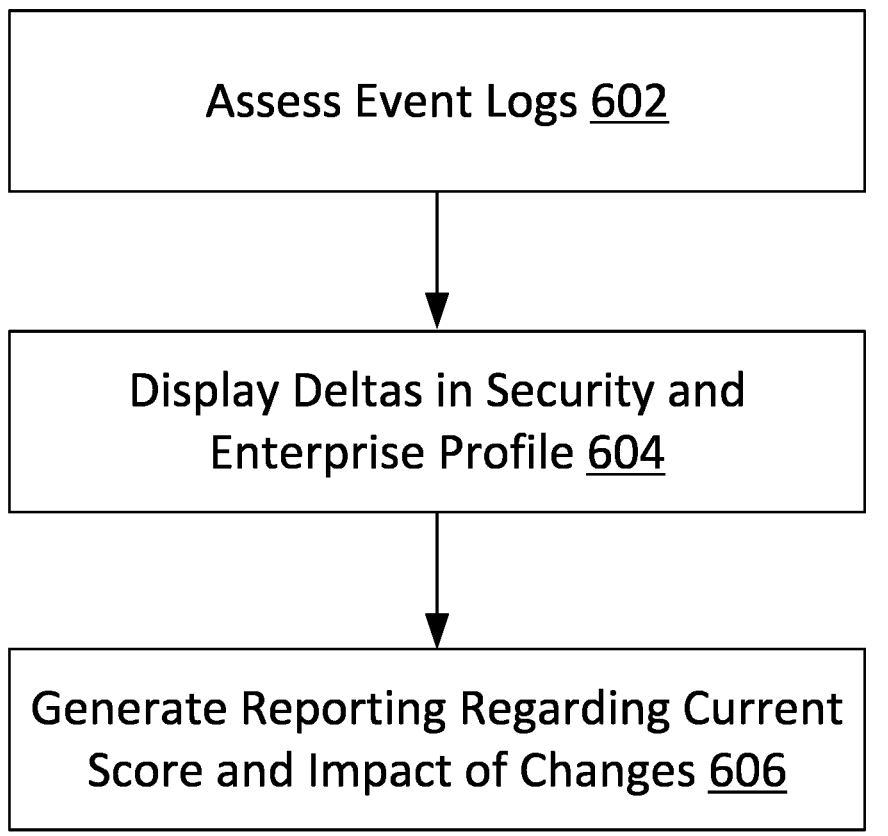
FIG. 6 illustrates a process flow chart for determining advisable security settings for an enterprise including a serverless or partially serverless environment according to aspects of the present disclosure.

Referring now to FIG. 6, a method 600 of determining advisable security settings for an enterprise, such as an enterprise utilizing serverless services, is disclosed. In the example shown, the method 600 includes assessment of event logs managed by the enterprise (step 602), for example accesses of serverless services, as well as accesses of data managed by the enterprise either in cloud or on premise. The method further includes displaying changes in security and enterprise profiles (step 604).

The method 600 further includes generating a report regarding a current score for the enterprise (step 606). The current score may be based, at least in part, on comparison of the current security measures taken as compared to either other similarly situated enterprises or to an ideal or recommended set of security settings. Optionally, the report may also include information regarding an impact of changes to security settings on that score (e.g., whether the score would increase or decrease, an amount of increase or decrease, etc.).

As seen in FIG. 7, an example report 700 is provided in a user interface of a computing system. The example report 700 may be generated, for example, upon execution of the method 600 of FIG. 6. In the example report 700 as shown, security features of an enterprise may be analyzed, as well as possible changes to security settings on the specific type of security feature that is an office. For example a change to a security feature such as reducing a number of administrative users may have a high impact or effect on users, may require comparatively little effort, and moderate impact. Such a change may result in a drastic improvement in score, as shown by the scoring value scene. However, a comparatively minor change, such as slowing down servers on a Sunday, may still have a high effect on users, but relatively low impact for particular types of enterprises. For example any retailer if not selling football gear or sports related memorabilia may not see a great impacts to such a change.

Figure 8:
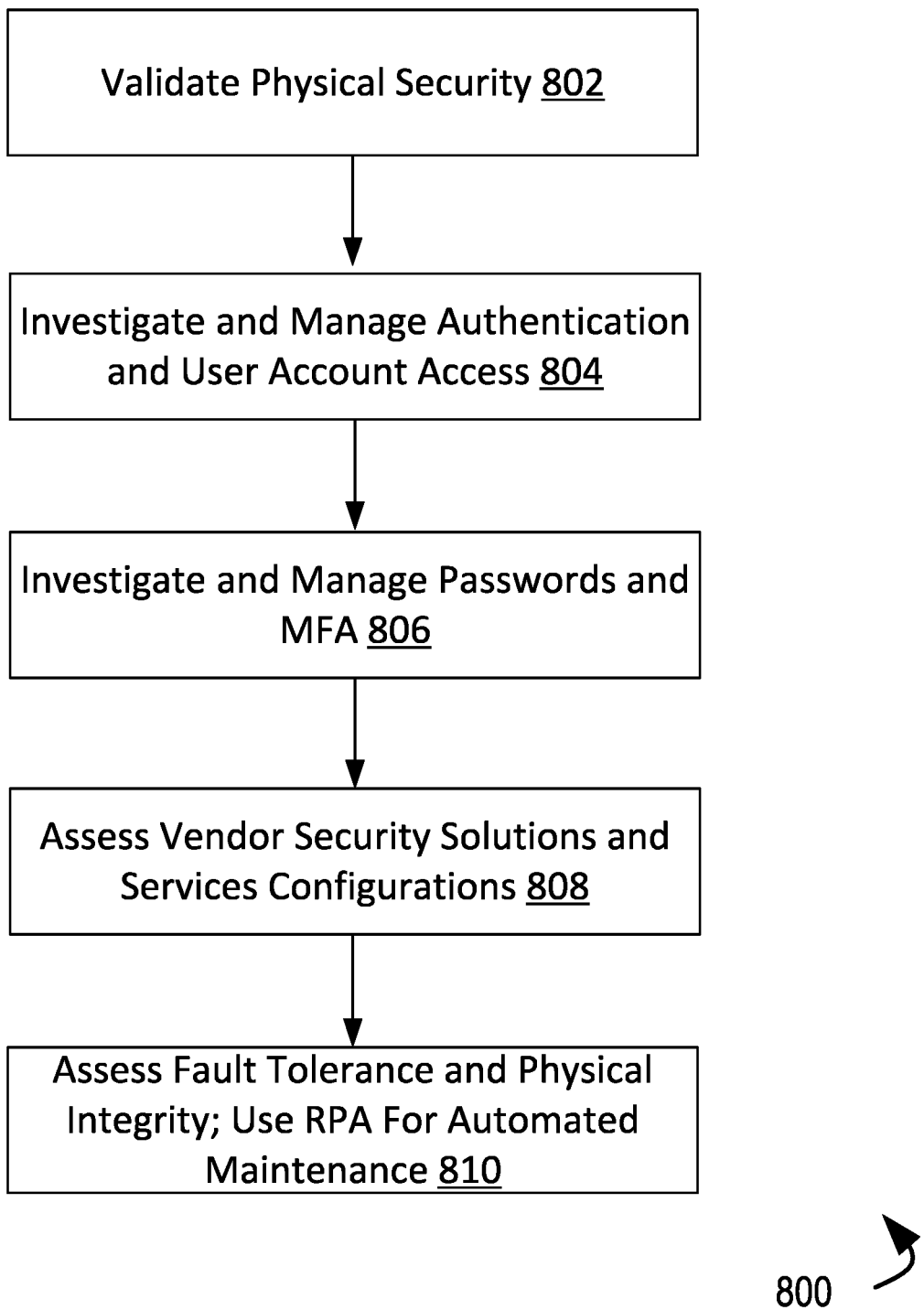
FIG. 8 illustrates example automated processes performed by or initiated by the serverless security assessment tool of the present disclosure.

Referring now to FIG. 8, a method 800 is shown for configuring and inspecting an enterprise security settings footprint, including serverless security settings. The method 800 can be used, for example, to accomplish step 406 of the method described above in FIG. 4.

In the example shown, method 800 includes a plurality of operations, which may be performed in any of a variety of orders. The method can include, for example, validating physical security of enterprise locations and other locations managing enterprise data and operations (step 802). This can include, for example, both validating physical security of enterprise locations, as well as investigating event logs relating to physical access. The method can further include investigating and managing authentication and user account access (step 804). This can include, for example, utilizing one or more bots defined within or controlled by the security assessment tool 100 to monitor each of the enterprise locations, including a user bot that can be utilized to act as a user to assess enterprise locations and set/modify security settings. The method can also include investigating in managing passwords and multi factor authentication settings (step 806), which similarly may be performed by such a user bot or an admin bot, as described below.

In the example shown, the method further can include assessing vendor security solutions and services, including configurations of such solutions and services (step 808). This can include, for example, updating service packs and/or patches to software, ensuring that fender security management solutions are activated, set up, and actively managed. The method further includes assessing fault tolerance and physical integrity of enterprise facilities and systems, and utilization of robotic process automation for automated maintenance activities that are to be performed on security infrastructure of the enterprise (step 810). Such processes may be performed by the user bot as noted above, or in the case of assessment of serverless services, may be performed by vendor product management bots 240 which are defined to be Referring generally to FIGS. 4-8, it is noted that, in some embodiments, the processes described may be performed in varying orders or may be performed cyclically, such that a constant process of monitoring, recommendation, and automated maintenance may be provided by the security assessment tool 100. In this way, serverless services may be ensured to be assessed for purposes of securing those services and data associated with the services, while allowing enterprise users to receive reports comparing their enterprise to other similarly situated enterprises, areas of potential improvement in securing serverless services and other on-premise or cloud computing resources.

FIG. 9 illustrates an environment 900 in which serverless security assessment is performed for a particular enterprise, according to an example embodiment. In the example shown, a security assessment tool 100 is configured to interact with various enterprise resources, including on-premise enterprise resources 902, cloud providers 20a-20b of the enterprise, as well as one or more serverless services 910 that are utilized by the enterprise.

In the example shown, the security assessment tool 100 can generally include the components described above in connection with FIG. 2; however, when deployed against a particular enterprise, one or more bots may be used to perform security assessment tasks. For example, an admin bot 220 may be used to perform administrative tasks relative to enterprise monitoring, such as controlling other bots, initiating scans of logs or other assessment tasks, and managing timing of the cyclical, periodic assessment and remediation processes described herein. Additionally, one or more user bots 230 may be used to automate processes otherwise performed manually, e.g., performing assessment of event logs, review of policies, etc. Such user bots may be defined as special-purpose, single purpose bots that are reusable to perform similar tasks across enterprises and are scalable according to enterprise size and/or needs.

Furthermore one or more vendor product management bots 240 may be used. In example implementations, separate vendor product management bots 240 may be dedicated to each serverless service that may be used by the enterprise, as well as optionally each of the cloud providers. In this way, the vendor product management bots 240 may be reused across different enterprises with little customization, and can readily scale as more or fewer serverless services are used by each enterprise.

When assessing the clouds 20a-b, the security assessment tool may, via the admin bot 220 or user bot, assess a vendor profile of the cloud provider, e.g., what security and automation tools the vendor provides, vendor license costs, roll out costs, criticality of the solution, alternative products, and availability of automation for various tasks within the cloud of that cloud provider.

Referring now to FIGS. 10-13, example user interfaces are presented that may be displayed based on access of and assessment by the securing assessment tool. For example, an admin bot 220, user bot 230, or vendor product management bots 240 may be used to provide assessment data to a serverless service 910 which may be accessible and generate user interfaces such as are shown.

Figure 10:
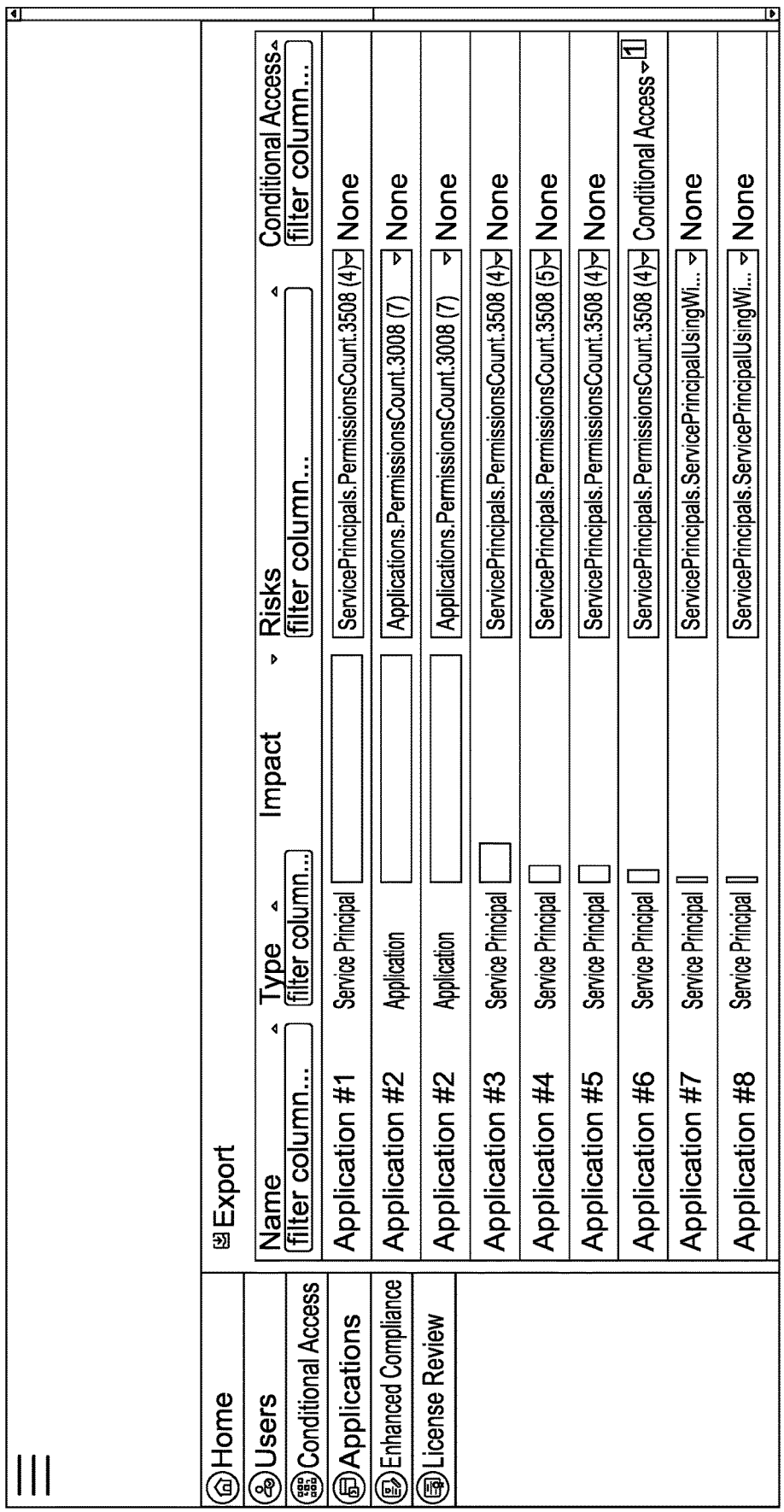
FIG. 10 is an example application scan user interface displayed via the serverless security assessment tool, according to an example embodiment.

FIG. 10 is an example application scan user interface 1000 displayed via the serverless security assessment tool, according to an example embodiment. In the example shown, the application scan user interface 1000 includes regions in which a user may select specific users, conditional access rights, applications, enhanced compliance, or a license review. In the user interface 1000 specifically, the "applications" field is selected, and a listing of detected applications present within the serverless environment are presented, as well as the types of applications, and specific risks posed by each application (illustrated near an "impact" bar in the form of a bar chart ordered in decreasing order of importance). Additionally, a conditional access field allows a user to view where conditioned access to the particular application is established, and what conditions/users are granted such access rights. Accordingly, on a per-application basis, a risk assessment may be performed (e.g., number of permissions, impact of those permissions, etc.) and displayed in a user-friendly manner to an administrator.

Figure 11:
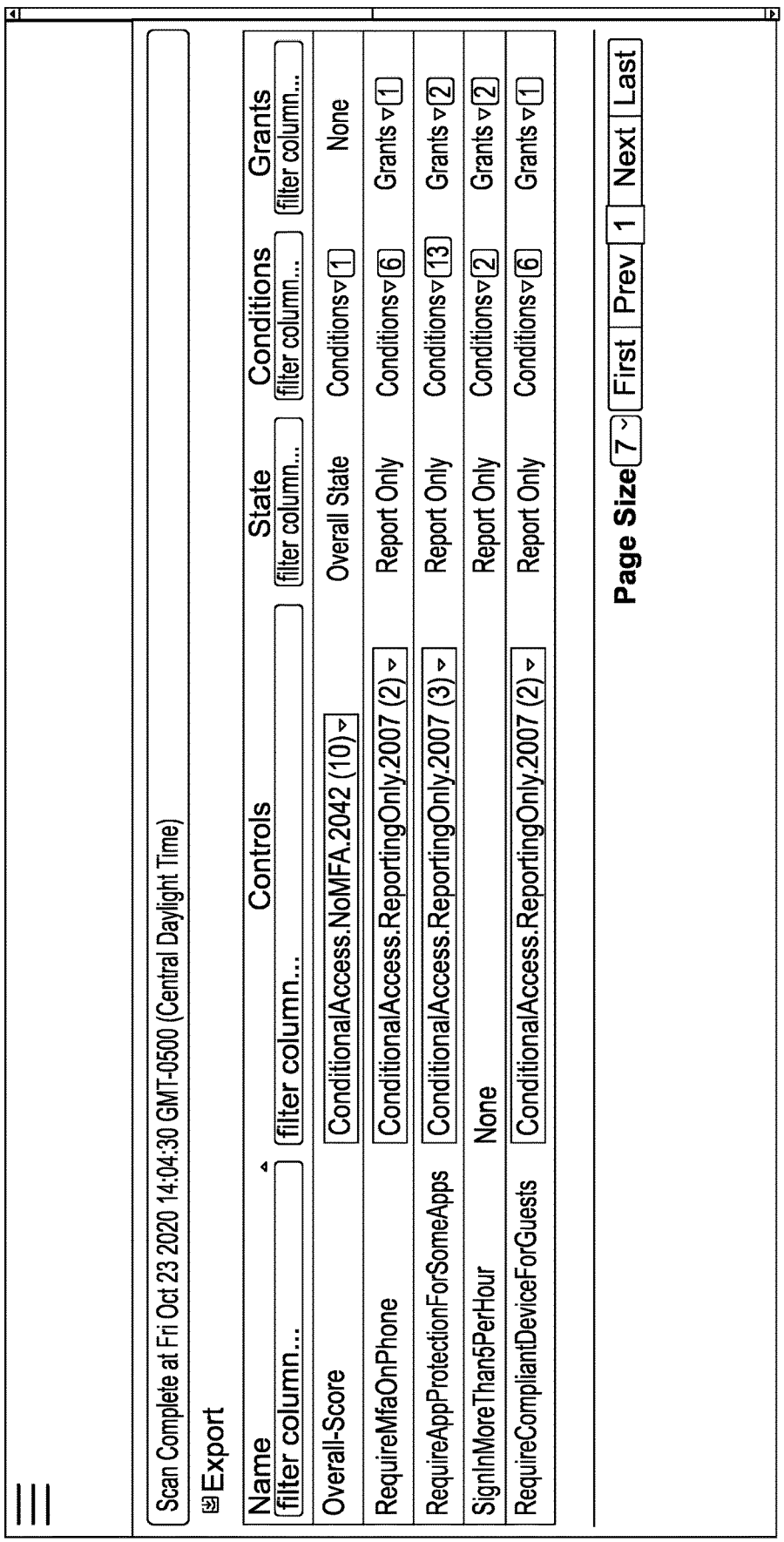
FIG. 11 is an example conditional access scan user interface displayed via the serverless security assessment tool, according to an example embodiment.

FIG. 11 is an example conditional access scan user interface 1100 displayed via the serverless security assessment tool, according to an example embodiment. The conditional access scan user interface 1100 may be presented, for example in response to selection of the conditional access rights option in the application scan user interface 1000 (or analogous options in user interfaces of FIGS. 12-13). In the example shown, the conditional access scan user interface 1100 displays various conditional access methodologies in place within an enterprise, controls, state, conditions, and grants of rights within that particular conditional access methodology. Examples shown include an overall score, a requirement to user multifactor authentication on a phone, a requirement to include application protection, a limit on a number of sign-in attempts per hour, and a requirement of a compliant device. Other types of methodologies derived from a scan may be provided as well.

Figure 12:
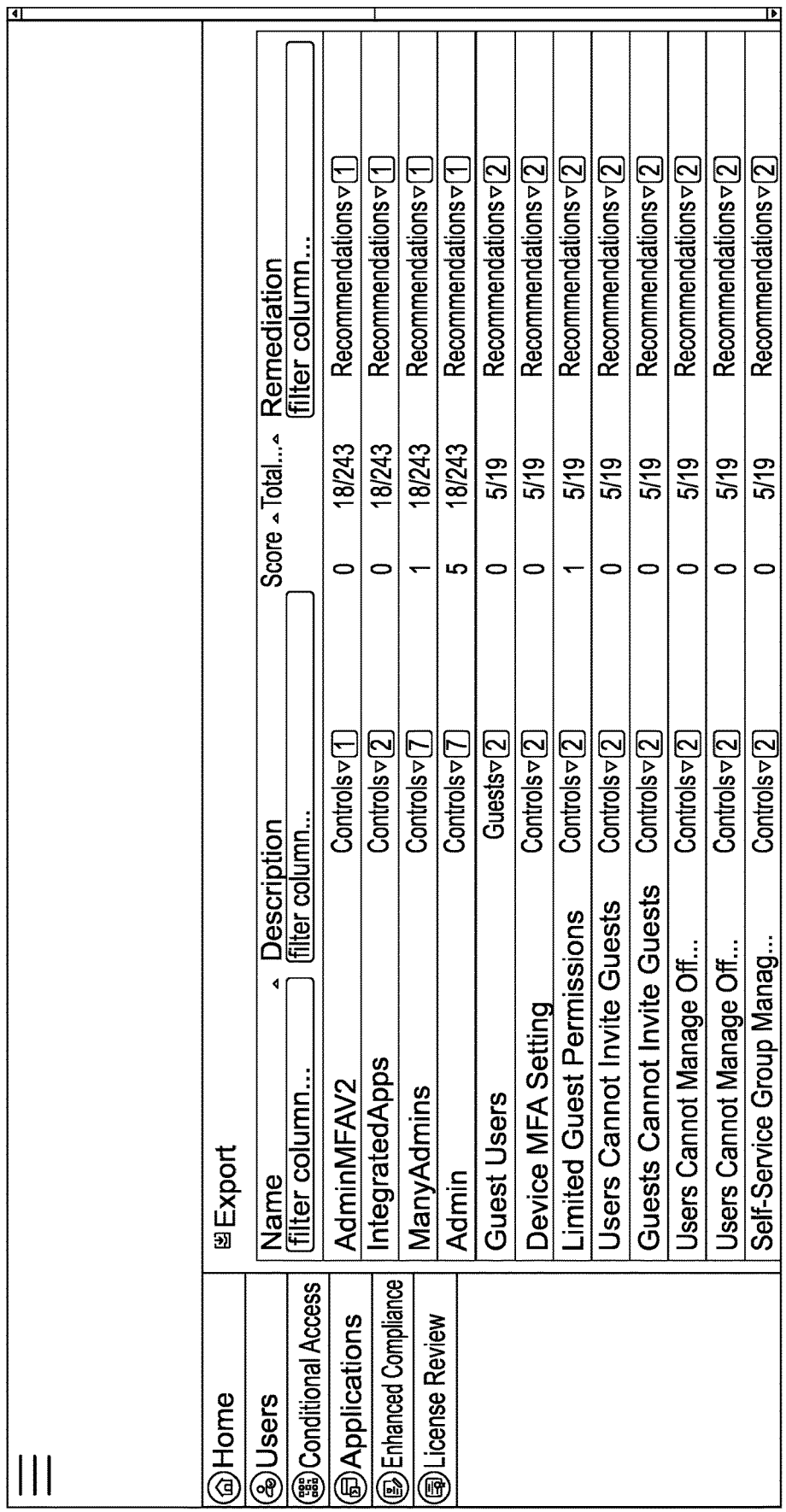
FIG. 12 is an example compliance scan user interface displayed via the serverless security assessment tool, according to an example embodiment.

FIG. 12 is an example compliance scan user interface 1200 displayed via the serverless security assessment tool, according to an example embodiment. The compliance scan user interface 1200 may be presented in response to selection of an "enhanced compliance" option within a set of presented options. The user interface 1200 presents a number of policies that may be adopted, controls useable to adjust those policies, a score associated with each policy, a total score out of possible scores, and recommendations to improve security over an entire enterprise.

FIG. 13 is an example user scan interface 1300 displayed via the serverless security assessment tool, according to an example embodiment. In this example interface, each user authorized with a particular role within an enterprise environment may be detected and displayed. For each user, one or more groups and states of that user within particular groups (e.g., member, administrator, guest administrator, etc.) may be presented. Additionally, one or more role assignment controls may be exposed by way of a selectable drop-down menu within the user interface associated with that user.

For each user presented within the user scan interface 1300, a risk and an administration score may be presented. The risk score may reflect a risk of exposure based on the roles associated with that user, while the administration score may reflect the level of access rights within the enterprise granted to the user. By adjusting one or more controls over role assignments in the drop-down menu, risk exposure and administrative access rights may be balanced appropriately by a security administrator to maintain administrative access flexibility while mitigating risk issues. An impact rating may indicate a criticality (within one or more thresholds of criticality) for adjustments to roles of users, with those users having highest criticality to possible changes to role assignments being sorted to the top of the user interface. Additionally, user profile creation and access dates may be presented, to allow the security administrator to readily view the last access times and age of various accounts.

Referring to FIGS. 1-13 generally, the security assessment tool and methods of operation discussed herein have a number of advantages. In particular, the security assessment tool may be flexibly deployed in a partially-automated or completely automated manner to reduce technology knowledge requirements of enterprise users while ensuring security measures remain in place during changes in a data, services, and physical footprint of an enterprise. The security assessment tool further incorporates knowledge of comparable enterprises and automates security updates to facilitate compliance with data security requirements, while being scalable to the size of the enterprise and having components reusable across enterprises. Furthermore, sensitive data is retained within the enterprise rather than being separately stored by the security assessment tool off-premise, thereby ensuring that no additional security vulnerability is introduced.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

The invention claimed is:

1. A method of automatically managing enterprise security for an enterprise utilizing at least one serverless service, the method comprising:
   executing an at least partially automated environment discovery process in which an overall security footprint of the enterprise is determined, the overall security footprint including a set of security requirements based on characteristics of the enterprise and a set of attributes associated with each of a plurality of serverless services utilized by the enterprise; and
   automatically identifying, via an enterprise security assessment tool, one or more security applications and associated settings capable of meeting the set of security requirements of the enterprise based on the sets of attributes associated with the plurality of serverless services.

2. The method of claim 1, wherein executing the at least partially automated environment discovery process includes:
   reviewing event logs generated by each of a plurality of services used by the enterprise; and
   at the enterprise security assessment tool, identifying the one or more security applications and associated settings based, at least in part, on a model generated from historical security settings utilized or recommended to similarly-situated enterprises.

3. The method of claim 1, further comprising generating a report illustrating the overall security footprint, the one or more security applications, and settings associated with the one or more security applications useable to implement the set of security requirements across the enterprise, including across the plurality of serverless services.

4. The method of claim 3, wherein the report includes a security score for each of a plurality of serverless services, the security score being based on a comparison of a current security configuration of the serverless service to a possible alternative security configuration.

5. The method of claim 4, wherein the possible alternative security configuration is a security configuration of a comparable enterprise.

6. The method of claim 3, further comprising automatically configuring the one or more security applications in accordance with the settings to achieve the set of security requirements.

7. The method of claim 6, wherein automatically configuring the one or more security applications includes recommending at least one security application in addition to a set of security applications used by the enterprise.

8. The method of claim 6, wherein automatically configuring the one or more security applications includes calling one or more robotic process automation components from the enterprise security assessment tool.

9. The method of claim 8, wherein the one or more robotic process automation components are maintained by the enterprise.

10. The method of claim 1, wherein the overall security footprint comprises a set of applications and data managed by the enterprise including location and user accessibility of the applications and data, identities and access rights of users having access rights to the applications and/or data.

11. The method of claim 1, wherein the enterprise utilizes a plurality of serverless services alongside on-premises computing resources having security management software managed by the enterprise, and wherein executing the at least partially automated environment discovery process further includes assessing security requirements of each of a plurality of enterprise security applications hosted on the on-premises computing resources.

12. The method of claim 1, wherein the characteristics of the entity include an identity of customers of the entity, a data footprint of data managed by the enterprise, a data security requirement of the data managed by the enterprise, and data reporting requirements of the enterprise.

13. The method of claim 12, wherein the data security requirement of the data managed by the enterprise is dictated by a set of data regulations defined externally to the enterprise.

14. An enterprise security assessment tool stored in a memory and executable on a computing device, the enterprise security assessment tool including:
an application programming interface (API) providing a communicative connection to computing resources of an enterprise, the enterprise utilizing a plurality of serverless services;
an assessment engine configured to:
execute an at least partially automated environment discovery process in which an overall security footprint of the enterprise is determined, the overall security footprint including a set of security requirements based on characteristics of the enterprise and a set of attributes associated with each of the plurality of serverless services utilized by the enterprise; and
automatically identify one or more security applications and associated settings capable of meeting the set of security requirements of the enterprise based on the sets of attributes associated with the plurality of serverless services.

15. The enterprise security assessment tool of claim 14, wherein the computing device is remotely connected to computing resources of the enterprise.

16. The enterprise security assessment tool of claim 14, wherein the assessment engine is configured to:
review event logs generated by each of a plurality of services used by the enterprise; and
identify the one or more security applications and associated settings based, at least in part, on a model generated from historical security settings utilized or recommended to similarly-situated enterprises.

17. The enterprise security assessment tool of claim 14, wherein the one or more security applications include at least one security application managed external to the enterprise.

18. The enterprise security assessment tool of claim 14, further comprising a robotic process automation component that is programmed to automatically configure the one or more security applications in accordance with the settings to achieve the set of security requirements.

19. The enterprise security assessment tool of claim 14, wherein the assessment engine is further configured to perform realtime monitoring of the overall security footprint of the enterprise and the settings of the one or more security applications.

20. The enterprise security assessment tool of claim 14, wherein the assessment engine is further configured to generate at least one report including a security score for each of a plurality of serverless services, the security score being based on a comparison of a current security configuration of the serverless service to a possible alternative security configuration.

21. The enterprise security assessment tool of claim 14, further comprising a data storage attribute database of attributes associated with each of the plurality of serverless services utilized by the enterprise.

* * * * *